March 30, 1954 R. W. ILLSLEY 2,673,790
RENDERING COOKER
Filed Sept. 16, 1950 3 Sheets-Sheet 1
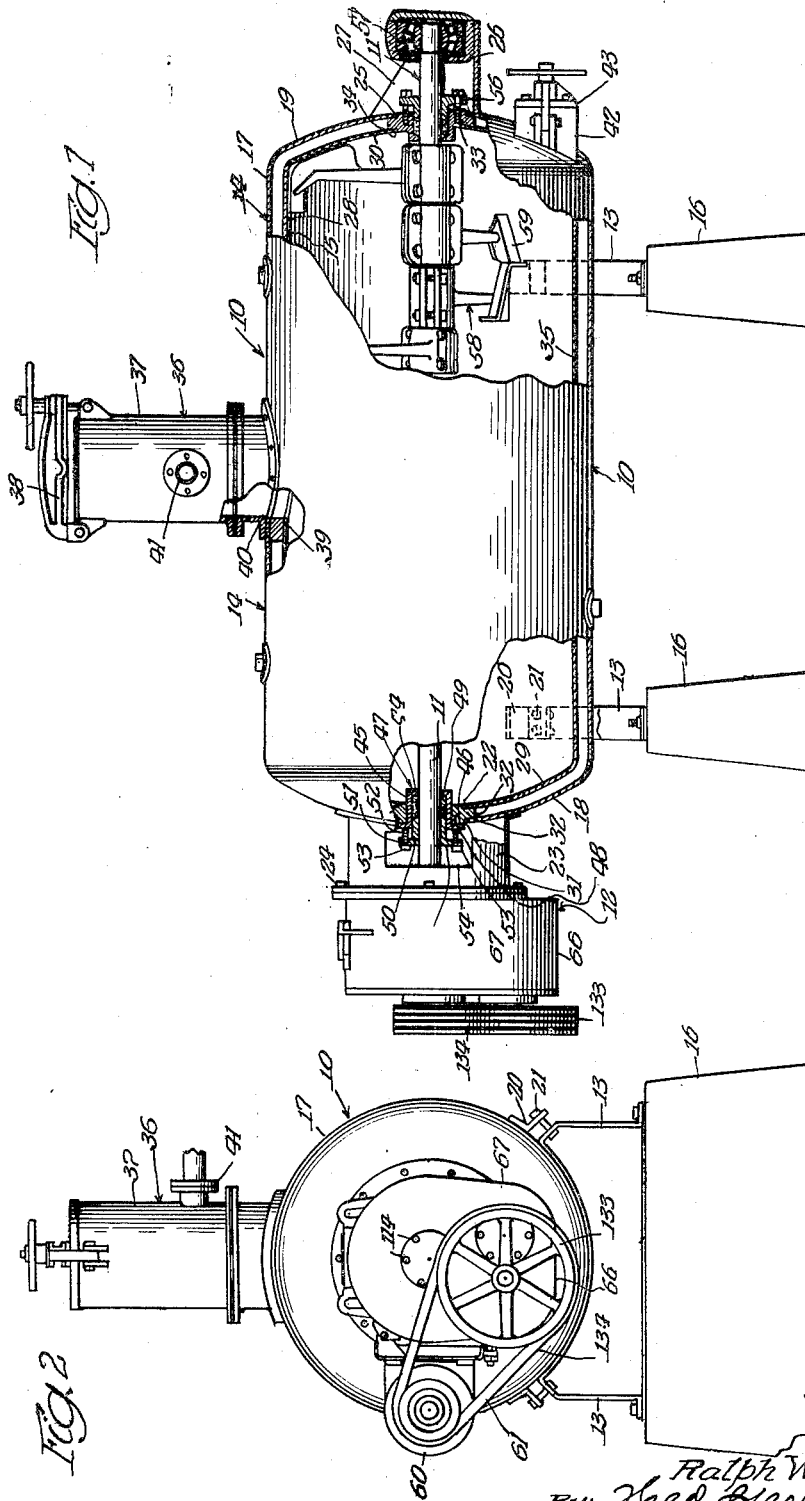
Inventor
Ralph W. Illsley
By: Fred Gerlach atty.

March 30, 1954  R. W. ILLSLEY  2,673,790
RENDERING COOKER
Filed Sept. 16, 1950  3 Sheets-Sheet 2
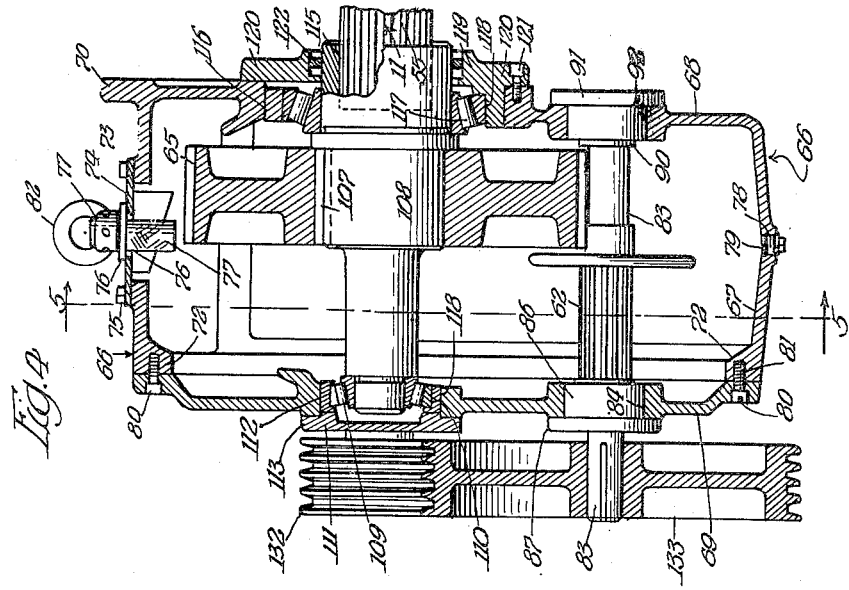
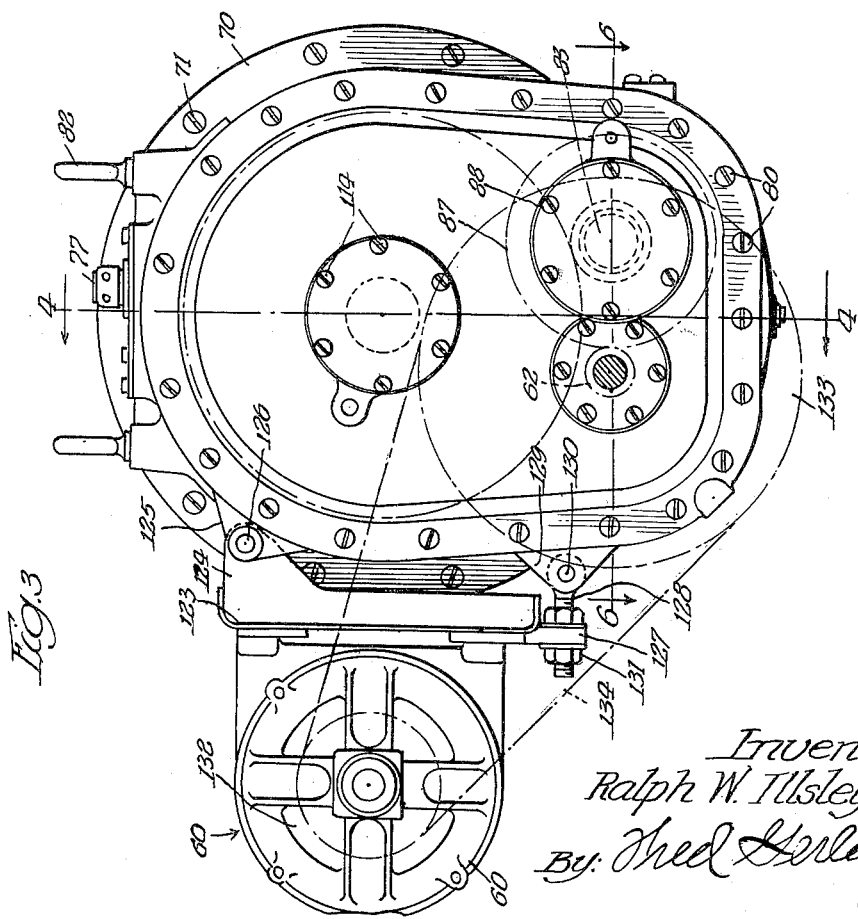
Inventor
Ralph W. Illsley
By: Fred Gerlach
Atty.

March 30, 1954  R. W. ILLSLEY  2,673,790
RENDERING COOKER
Filed Sept. 16, 1950  3 Sheets-Sheet 3
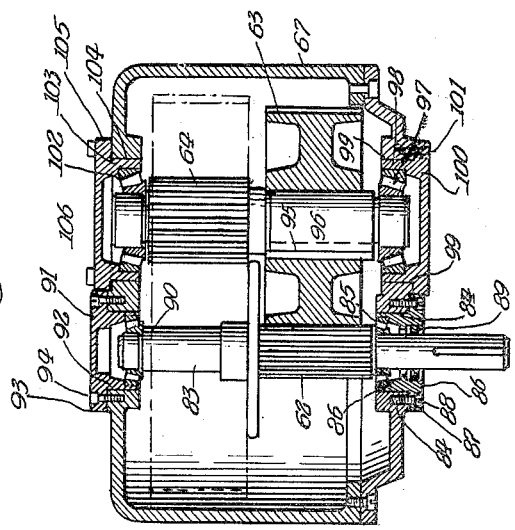
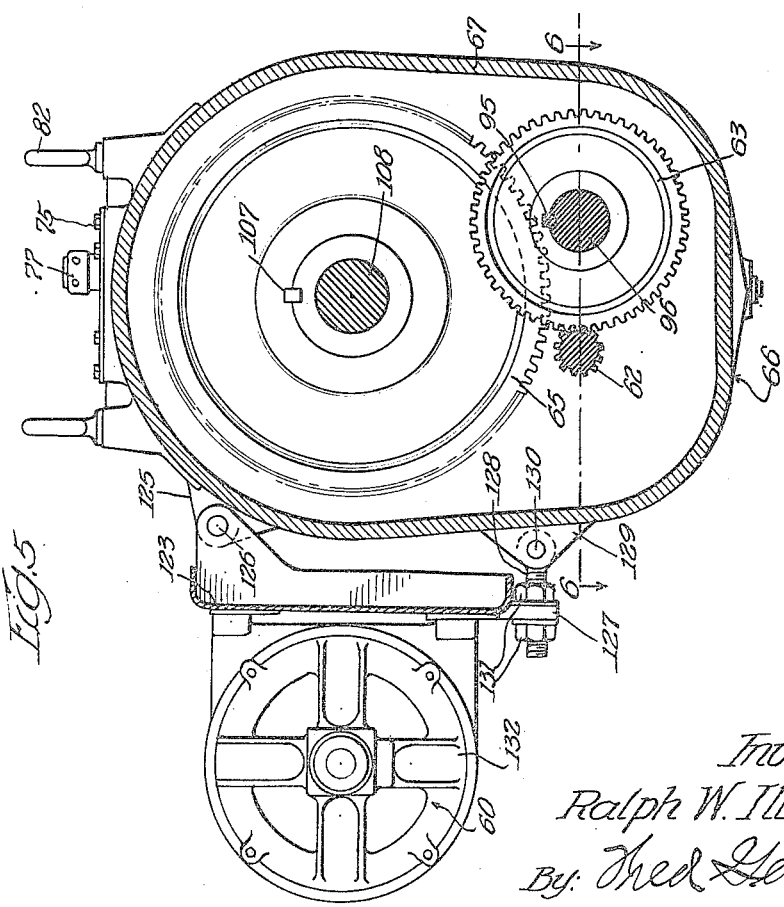
Inventor:
Ralph W. Illsley
By: Fred Gerlach
atty.

UNITED STATES PATENT OFFICE 2,673,790

RENDERING COOKER

Ralph W. Illsley, Chicago, Ill., assignor to The Allbright-Nell Company, Chicago, Ill., a corporation of Illinois Application September 16, 1950, Serial No. 185,309

2 Claims. (Cl. 23—280)

The present invention relates generally to rendering cookers. More particularly the invention relates to that type of cooker which serves as a medium or instrumentality for rendering animal carcasses and the like as a preliminary to forming cracklings, effects rendering or digesting by high pressure and subsequent vacuum cooking operations, and as its principal components comprises (1) a cylindrical horizontally extending steam jacketed tank which consists of outer and inner spaced apart shells, is supported over a concrete or other foundation by way of spaced apart cradles, and has a vertically extending charging dome at its upper central portion and a door closed discharge opening at one end thereof; (2) an elongated horizontally disposed agitator shaft which extends longitudinally through the central portion of the tank interior, has its ends extending through over-sized circular holes in the end walls of the outer and inner tank forming shell, and also surrounded by stuffing boxes in such holes and journalled in exteriorly disposed bearings outwards of the stuffing boxes, embodies a longitudinal series of radially extending paddles, is adapted during high pressure and subsequent high vacuum cooking operations to be driven in one direction in order to effect agitation of the material being rendered and is further adapted, after the cooking operations, to be reversely driven in order that the paddles, due to their particular construction or shape, effect discharge of the rendered or digested material through the discharge opening at the one end of the tank; and (3) power mechanism which is located directly outwards of the other end of the tank, serves to drive the paddle equipped agitator shaft in either direction and consists of a reversible electric motor and speed reducing gearing between the armature shaft of the motor and the adjacent end of the agitator shaft.

As evidenced by United States Patent No. 1,630,124, dated May 24, 1927, it has heretofore been proposed in a cooker of the aforementioned type to provide on the concrete foundation a separate or independent mount for the power mechanism for driving the agitator shaft and to utilize as parts of the speed reducing gearing of the mechanism a driving pinion and a bull or large sized gear which meshes with, and is driven by, the pinion and is fixedly connected to the adjacent end of the agitator shaft. In practice it has been found that there are certain disadvantages or objections to so mounting and constructing the power mechanism for driving the agitator shaft. In the first place, if the concrete foundation under the separate or independent mount for the power mechanism becomes distorted with respect to the concrete foundation under the cradles for the tank, due either to settling or expansion and contraction, the driving pinion moves out of proper meshing relation with the bull gear and results in either a too tight or too loose driving connection. If the driving connection between the pinion and bull gear is too tight and results in binding the pinion or the bull gear is likely to fracture and the electrical power input to the reversible motor increases materially. In addition, the agitator shaft bearing that is adjacent the bull gear is subjected to undue strain or load. If the driving connection is too loose the meshing teeth wear rapidly and in connection with operation of the power mechanism produce highly objectionable noise. Another objection to mounting and constructing the power mechanism as heretofore set forth resides in the fact that sagging or bending of the agitator shaft results in the driving connection between the pinion and the bull gear becoming too tight or too loose, depending upon the location of the pinion with respect to the bull gear.

One object of the invention is to provide a cooker which is an improvement upon, and eliminates the objections to, previously designed cookers and is characterized by the fact that the power mechanism is in the form of a self contained unit which is mounted and supported on the adjacent end of the tank as contradistinguished from a separate mounting which is independent of, or separate from, the tank. By mounting the power mechanism directly on the adjacent end of the tank settling or distortion of the concrete foundation under the cooker as a whole does not result in misalignment of the driving pinion with respect to the bull gear.

Another object of the invention is to provide a cooker of the type and character under consideration in which the tank end wall that is adjacent the power mechanism for driving the agitator shaft is provided with a fixed externally disposed mounting ring around the adjacent stuffing box, and the various gears of the speed reducing gearing of the power mechanism including the pinion and the bull gear are mounted in a closed lubricant-containing housing which is fixedly connected to the outer end of the aforementioned mounting ring.

Another object of the invention is to provide a cooker of the last mentioned character in which the hub of the bull gear surrounds and is keyed to a quill shaft which is journalled in roller bearings in the housing and has the inner end thereof extending through the housing and provided with internal equidistantly spaced splines, and the adjacent end of the agitator shaft fits within the inner end of the quill shaft and has coacting external equidistantly spaced splines in engagement with the internal splines of the quill shaft. By providing a spline type driving connection of the aforementioned character the spline equipped end of the agitator shaft is permitted to vary in axial alignment to a limited extent with respect to the inner end of the quill shaft in the event of sagging or bending of the agitator shaft and hence sagging or bending of the last mentioned shaft does not effect misalignment of the bull gear with respect to the driving pinion. Another advantage in employing a spline type driving connection is that the agitator shaft is permitted to expand or contract without in any way affecting the speed reducing gearing of the power mechanism.

Another object of the invention is to provide a rendering cooker of the aforementioned type in which the reversible electric motor of the power mechanism is located at one side of the closed lubricant-containing housing for the gears, operates to drive the gears in the housing through the medium of a belt and pulley connection and is mounted on a hinged bedplate in order that it may be adjusted to or from the housing in order to determine or control the amount of slack in the belt component of such connection.

A further object of the invention is to provide a cooker of the type and character heretofore mentioned in which the mounting ring between the power mechanism for driving the agitator shaft and the adjacent end of the tank embodies openings in its sides for permitting access to the adjacent stuffing box.

A still further object of the invention is to provide a rendering cooker which is generally of new and improved construction, effectively and efficiently fulfills its intended purpose, and, due to the manner of mounting and constructing the power mechanism, is characterized by substantially noiseless operation, shortness of overall length and low cost of maintenance.

Other objects of the invention and the various advantages and characteristics of the present rendering cooker will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side elevation of a rendering cooker embodying the invention, certain parts of the cooker tank being broken away and other parts being shown in section for purposes of illustration;

Figure 2 is a front elevation illustrating generally the manner of mounting and construction of the self-contained power mechanism for driving the paddle equipped agitator shaft in either direction;

Figure 3 is an enlarged front elevation of the power mechanism showing in detail the manner in which the reversible electric motor is mounted on the pivoted bedplate in order that it may be bodily adjusted in order to take up slack in the belt component of the pulley and belt driving connection between the motor armature shaft and the input shaft for one of the gears in the closed lubricant containing housing;

Figure 4 is a vertical longitudinal section taken on the line 4—4 of Figure 3 and showing the arrangement and manner of mounting of the quill shaft and also the construction of the spline type driving connection between the inner end of the quill shaft and the adjacent end of the agitator shaft;

Figure 5 is a vertical transverse section taken on the line 5—5 of Figure 4 and illustrating the arrangement of the various gears within the housing; and Figure 6 is a horizontal section on the line 6—6 of Figure 3.

The cooker which is shown in the drawings constitutes the preferred form or embodiment of the invention. It is adapted for use in a rendering establishment or plant and serves as a medium or instrumentality for rendering or digesting animal carcasses and the like. As its principal parts or components the cooker comprises a tank 10, an agitator shaft 11 and power mechanism 12 for driving the agitator shaft in either direction.

Tank

The tank 10 is generally cylindrical in shape or configuration and extends horizontally as shown in Figure 1 of the drawings. It is supported in an elevated position with respect to the floor of the establishment by way of a pair of spaced apart cradles 13 and consists of an outer shell 14 and an inner shell 15. The cradles 13 rest on, and are fixedly secured to, the upper ends of a pair of spaced apart concrete pedestals 16, the lower ends of which rest on, and are bolted or otherwise suitably anchored to, the floor of the establishment or plant in which the cooker is utilized. The outer shell 14 of the tank is formed of steel and consists of a continuous side wall 17 and a pair of outwardly bulged end walls 18 and 19. The lower portion of the side wall 17 of the outer shell 14 fits within the upper portions of the cradles 13 and embodies directly above the outer corners of the cradles welded in place L-shaped brackets 20. Bolts 21 extend through certain parts of the brackets and the upper corners of the cradles and serve fixedly to connect the tank as a whole to the cradles. The end wall 18 of the outer shell 14 is located at what may be considered or termed the front end of the tank. It embodies a central circular opening 22 and has its outer margin welded to the adjacent end margin of the continuous side wall 17. Disposed directly outwards of the front end wall 18 of the outer shell is a large sized mounting ring 23. The latter is of materially greater diameter than, and is in coaxial relation with, the circular opening 22, constitutes a mounting element for the hereinafter described housing, and has the inner end thereof welded or otherwise fixedly connected to the front end wall 18. The outer end of the mounting ring 23 is surrounded by a steel annulus 24 which is preferably welded in place. The end wall 19 of the outer shell 14 is located at the rear end of the tank and has in the central portion thereof a circular opening 25 which is the same in size as, and is in axial alignment with, the circular opening 22 in the central portion of the front end wall 18. The outer margin of the rear end wall 19 is welded or otherwise fixedly secured to the adjacent end margin of the continuous side wall 17 of the outer shell 14. Directly beneath the opening 19 is a horizontal outwardly extending shelf 26 which is welded to the outer surface of the rear end wall 19 and is reenforced by a pair of laterally spaced triangular brace plates 27.

The inner shell 15 of the tank 10 is disposed within, and spaced a small distance from, the outer shell 14. It is formed of steel and consists of a cylindrical side wall 28, an outwardly bulged front end wall 29 and an outwardly bulged rear end wall 30. The front end wall 29 has the outer margin thereof welded to the front end margin of the cylindrical side wall 28 and embodies in its central portion a circular opening 31 which is of slightly less diameter than, and is in coaxial relation with, the central opening 22 in the front end wall 18 of the outer shell. An annular centering member 32 fits within, and is welded to, the opening defining portions of the front end walls 18 and 29 and serves with a similar annular centering member 33 at the rear end of the tank to hold the inner shell 15 in centered and spaced relation with the outer shell 14. The outwardly bulged rear end wall 30 of the inner shell has its outer margin welded to the rear end margin of the cylindrical side wall 28 and embodies in its central portion a circular opening 34 which corresponds in diameter to, and is in axial alignment with the opening 31 in the front end wall 29. The annular centering member 33 fits within, and is welded to, the opening defining portions of the rear end walls 19 and 30. The space between the outer and inner shells of the drum constitutes a steam jacket 35 for affecting high pressure cooking of the material that is delivered into the interior of the inner shell. Steam is circulated through the jacket 35 by way of inlet and outlet pipes (not shown).

The material (animal carcasses) to be rendered or digested in the tank is introduced into the interior of the inner shell 15 by way of a charging dome 36. The latter is located on the central portion of the top of the tank and is in the form of an elongated vertically extending conduit 37 and a hinged cover 38 at the upper end of the conduit. The lower end of the conduit is suitably connected to the upper central portion of the cylindrical side wall of the outer shell and communicates with the interior of the inner shell by way of openings 39 and 40 which are formed respectively in the central upper portions of the side walls of the inner and outer shells. A valve equipped pipe 41 is connected to the central portion of the conduit 37 and leads to a suction pump (not shown). It is contemplated that after the material to be rendered or digested has been subjected to high pressure cooking within the inner shell for a predetermined period the suction pump will be placed in operation in order to subject the material in the inner shell to a vacuum for purposes of withdrawing excess moisture vapor and cool the material. A tubular member 42 extends through aligned holes in the lower portions of the rear end walls of the inner and outer shells and defines a discharge opening for the rendered or digested material. The outer end of the member 42 is provided with a hinged door 43 whereby the discharge opening may be closed while the material is being rendered or digested in the tank.

Agitator shaft

The agitator shaft 11 of the cooker extends longitudinally through the central portion of the tank interior and is adapted, as hereinafter described, to be driven in either direction by the power mechanism 12. The front end of the shaft projects through the annular centering member 32 and is surrounded by a stuffing box 44. The latter is of conventional or standard design and comprises a tubular body 45 which fits snugly within the inner periphery of the member 32 and embodies an outwardly extending flange 46 at its outer end and an inwardly extending flange 47 at its inner end. The outwardly extending flange 46 fits against the outer surface of the annular centering member 32 and is fixedly secured in place by means of an annular series of bolts 48. In addition to the tubular member 45 the stuffing box 44 comprises packing 49 within said member 45 and a follower 50. The follower is slidably mounted in the outer end of the tubular member 45 and serves to compress the packing 49 against the inwardly extending flange 47 and the shaft 11. The outer end of the follower is provided with an outwardly extending flange 51. This flange has holes therein through which extend studs 52 having nuts 53 at their outer ends. The inner ends of the studs fit in screw threaded holes in the outwardly extending flange 46 on the outer end of the tubular member 45. When the nuts 53 on the outer ends of the studs are tightened the follower 50 is urged inwards so as to compress the packing and cause it to provide a seal around the front end of the agitator shaft 11. As shown in the drawings the sides of the mounting ring 23 are provided with circumferentially elongated openings 54 whereby access may be had to the nuts 53 for tightening or loosening purposes. The front extremity of the agitator shaft projects a short distance beyond the outer end of the mounting ring 23 and is provided with an annular series of external longitudinally extending equidistantly spaced splines 55. The rear end of the agitator shaft projects through the annular centering member 33 at the rear end of the tank and is surrounded by a stuffing box 56. The latter is similar to the stuffing box 44 and seals the space between the annular centering member 33 and the adjacent rear end portion of the agitator shaft. The rear extremity of the agitator shaft is journalled in a bearing 57 which is mounted on the shelf 26. Such bearing is essentially a thrust bearing and serves to hold the adjacent end of the shaft 11 against axial displacement. The portion of the agitator shaft that is within the inner shell is provided with a longitudinal series of radially extending paddles 58. The latter are angularly offset with respect to one another and serve when the shaft is driven in one direction in connection with cooking operations to agitate the material being rendered or digested. The outer ends of the paddles have curved and angularly arranged deflector surfaces 59 which operate when the shaft is reversely driven at the conclusion of the cooking operations axially to displace the rendered or digested material so as to force it through the discharge opening that is defined or formed by the door equipped tubular member 42.

Power mechanism

The power mechanism 12 for driving the paddle equipped agitator shaft 11 in either direction is located at the front end of the tank 10. It is essentially in the form of a self-contained unit and consists of a reversible electric motor 60, a belt and pulley connection 61, a pinion 62, a gear 63, a pinion 64 and a bull gear 65. The belt and pulley connection 61, the pinion 62, the gear 63, the pinion 64 and the bull gear 65 constitute speed reducing gearing between the armature shaft of the electric motor 60 and the front end of the agitator shaft 11. The pinion 62 and the gear 63 are preferably of the helical teeth type, and the pinion 64 and the bull gear 65 are preferably spur gears. As shown in Figures 4, 5 and 6 the aforementioned pinion, gear, pinion and bull gear are disposed within what may be considered a closed housing 66.

Said housing is located directly in front of the mounting ring 23 and consists of a continuous side wall 67, a rear wall 68, and a front wall 69. The upper and side portions of the rear end margin of the continuous side wall is provided with an integral outwardly extending arcuate flange 70 and this abuts directly against the upper and side portions of the steel annulus 24 and is fixedly but removably secured to the latter by a series of spaced apart bolts 71. The continuous side wall 67 of the housing 66 is provided at the front margin thereof with a continuous inwardly extending integral flange 72 and has in the top portion thereof a rectangular opening 73 through which the interior of the housing may be inspected. Such opening is normally closed by a rectangular cover plate 74 which is removably secured in place by way of an annular series of cap screws 75. The latter extend through holes in the margin of the cover plate 74 and into screw threaded sockets in the portion of the housing side wall that defines the rectangular opening 73. Oil for lubricating purposes is introduced into the interior of the housing by way of a hole 76 in the central portion of the cover plate 74. The hole 76 is normally closed by a combined oil filler cap and air filter 77. A hole 78 in the bottom portion of the housing side wall 67 permits the oil to be drained from the housing interior when desired. A screw plug 79 serves as a removable closure for the hole 78. The front wall 69 is formed separately from, and is shaped conformably to, the continuous side wall 67 and is removably secured in place by means of cap screws 80. The latter extend through holes in the marginal portion of the front wall 69 into screw threaded sockets 81 in the inwardly extending flange 72 on the front end margin of the housing side wall. As shown in the drawings the housing is vertically elongated. The upper portion of the continuous side wall 67 is provided with a pair of upstanding eyebolts 82. The latter are located on opposite sides of the inspection opening 73 and permit the housing to be manipulated into and out of place by way of a crane or other portable hoisting apparatus.

The pinion 62 is formed as an integral part of the central portion of a horizontally extending shaft 83 and is disposed in the front lower portion of the interior of the housing 66. As best shown in Figure 6, the shaft 83 extends from front to back so far as the housing is concerned. The front end of the shaft 83 extends completely through a circular opening 84 in the lower portion of the front wall 69 of the housing and is journalled in a roller bearing 85 comprising inner and outer races and rollers between the races. The outer race of the bearing 85 is seated within an annular groove in the inner end of a bearing sleeve 86. The latter fits within the circular opening 84 and is provided at its outer end with an integral outwardly extending flange 87 which fits against the portion of the housing front wall that defines the opening 84 and is removably secured thereto by screws 88. An oil seal 89 extends between the outer end of the bearing sleeve 86 and the adjacent portion of the front end of the shaft 83 and serves to prevent leakage of oil through the bearing sleeve. The rear end of the shaft 83 is journalled in a roller bearing 90 comprising inner and outer races and an annular series of rollers between the races. The outer race of the bearing 90 is seated within an annular groove in the inner end of a bearing cup 91. The latter fits within a circular opening 92 in the lower portion of the rear wall 68 of the housing and is provided at its outer end with an outwardly extending flange 93 which fits against the portion of the housing rear wall that defines the opening 92, and has screws 94 whereby the bearing cup 91 is removably secured in place.

The gear 63 is located at one side of the pinion 62. It meshes with, and is driven by, such pinion and extends around, and is connected by way of a key 95 to, the front end of a shaft 96. The latter is disposed in parallel relation with the shaft 83 and has the front extremity thereof journalled in a roller bearing 97 comprising inner and outer races and an annular series of rollers between the two races. The outer race of the bearing 97 fits within an annular groove in the inner end of a bearing cup 98. Such bearing cup fits within a circular opening 99 in the lower portion of the front wall 69 of the housing 67 and is provided at its outer end with an outwardly extending flange 100. The latter fits against the portion of the housing front wall that defines the opening 99, and is removably secured in place by screws 101. The rear or inner extremity of the shaft 96 is journalled in a roller bearing 102 comprising inner and outer races and an annular series of rollers between the two races. The outer race of the bearing 102 is seated in an annular groove in the inner end of a bearing cup 103. The latter fits within a circular opening 104 in the lower portion of the housing rear wall 68 and is provided at its outer end with an integral outwardly extending flange 105. Such flange fits against the portion of the housing rear wall that defines the opening 104, and is removably secured in place by screws 106.

As shown in Figure 6 of the drawings, the pinion 64 is formed as an integral part of the rear or inner end of the shaft 96. It meshes with and serves to drive the bull gear 65.

The bull gear 65 is located in the upper portion of the interior of the housing 66 and extends around, and is connected by a key 107 to, the central portion of a quill shaft 108. Such shaft is disposed in parallel relation with the shafts 83 and 96 and has the front end thereof journalled in a roller bearing 109. The latter comprises inner and outer races and an annular series of rollers between the two races. The outer race is seated within an annular groove 110 in the inner end of a bearing cup 111. Such cup fits within a circular opening 112 in the upper central portion of the housing front wall 69 and embodies at its outer end an integral outwardly extending flange 113 which is removably secured in place by way of an annular series of screws 114. The rear or inner end of the quill shaft 108 is hollow and embodies an annular series of equidistantly spaced internal splines 115. It extends completely through an over-sized circular opening 116 in the upper central portion of the rear wall of the housing 66 and is journalled in a roller bearing 117 comprising inner and outer races and an annular series of rollers between the two races. The outer race of the bearing 117 is seated within an annular groove 118 in the inner end of a bearing sleeve 119. The latter fits within the circular opening 116 and embodies at its outer end an integral outwardly extending flange 120 which is removably secured in place by an annular series of screws 121. A ring shaped seal 122 extends between the outer end of the bearing sleeve 119 and the adjacent portion of the rear end of the quill shaft and prevents leakage of oil through the bearing sleeve. As shown in Figure 4 the front extremity of the paddle equipped agitator shaft 11 extends into the rear end of the quill shaft 108 and the external splines 55 on such extremity are in meshing or interfitting relation with the internal splines 115 and form therewith a driving connection whereby the agitator shaft is caused to be driven in response to drive of the quill shaft. The coacting splines 55 and 115 permit limited sliding and tilting of the front extremity of the agitator shaft in response to sagging or bending of the agitator shaft. They also permit the housing 66 with the various pinions and gears therein to be removed from the mounting ring 23 by sliding or shifting it forwards after removal of the bolts 71 that extend normally through the outwardly extending flange 70 on the continuous side wall 67 of the housing and the steel annulus 24 on the front or outer end of the mounting ring. When the housing is in its operative position the roller bearings 109 and 117 have a twofold purpose in that they serve rotatably to support not only the quill shaft 108 but also the front end of the paddle equipped agitator shaft 11.

The reversible electric motor 60 is located a small distance outwards of one side of the housing 66 and is arranged so that the armature shaft thereof is in parallel relation with the shafts 83, 96 and 108. The inner side of the casing of the motor fits against and is bolted or otherwise fixedly secured to a substantially vertical bedplate 123. The upper corners of the bedplate are provided with integral inwardly extending lugs 124 which are in lapped relation with outwardly extending lugs 125 on the adjacent portion of the continuous side wall 67 of the housing 66. A pivot pin 126 extends through aligned holes in the lugs 124 and 125 and forms hinge connections whereby the bedplate 123 together with the reversible electric motor 60 may be swung or adjusted laterally to or from the housing. The lower portion of the bedplate is provided with a depending centrally apertured lug 127 through which extends the shank of an eyebolt 128. The eye part of the eyebolt is disposed between a pair of outwardly extending laterally spaced lugs 129 on the adjacent side portion of the continuous side wall 67 of the housing 66 and is pivotally connected thereto by way of a horizontally extending pivot pin 130. The latter extends through the eye part of the bolt and aligned or coaxial holes in the lugs 129 and permits the shank of the eyebolt to swing upwards or downwards in a vertical plane. The shank of the eyebolt 128 is provided with a pair of nuts 131 and these are arranged in straddled relation with the depending lug 127 on the lower portion of the bedplate 123. By adjusting the nuts 131 in one direction or the other on the shank of the eyebolt the bedplate together with the electric motor 60 may be swung to or from the housing 66.

The belt and pulley connection 61 of the power mechanism 12 constitutes a driving connection between the armature shaft of the electric motor 60 and the pinion carrying shaft 83 and consists of a small sized pulley 132, a large sized pulley 133 and a plurality of endless belts 134. The small sized pulley 132 is keyed or otherwise fixedly secured to the front end of the armature shaft of the electric motor 60 and is disposed in a vertical plane that is in parallel relation with, but spaced slightly forwards of, the front wall 69 of the housing 66. The large sized pulley 133 is disposed in the same vertical plane as the small sized pulley and has the hub thereof keyed or otherwise fixedly secured to the front end of the shaft 83. The belts 134 are arranged in side by side relation and extend around, and fit within grooves in, the two pulleys 132 and 133. When the electric motor 60 is driven in one direction it operates through the medium of the belt and pulley connection 61, the pinion 62, the gear 63, the pinion 64 and the bull gear 65 to drive the paddle equipped agitator shaft 11 in one direction and when it is driven in the opposite direction it operates through the aforementioned parts reversely to drive the agitator shaft.

The herein described rendering cooker effectively and efficiently fulfills its intended purpose and is characterized by the fact that the power unit 12 thereof is in the form of a self-contained unit which is mounted on the front end of the tank 10. By mounting the power mechanism on the front end of the tank as contradistinguished from independently of the tank there is always a proper driving connection between the mechanism and the agitator shaft regardless of settling or distortion of the floor over which the cooker as a whole is positioned. Another advantage in having the power mechanism in the form of a self-contained unit that is mounted on the front end of the tank is that it is possible materially to reduce the overall length of the cooker. By employing the spline type or variety driving connection between the quill shaft 108 and the agitator shaft sagging of the agitator shaft does not produce misalignment of the bull gear 65 with respect to the pinion 64. Another advantage in employing a spline type driving connection between the quill shaft and the agitator shaft is that the housing for the various pinions and gears of the speed reducing gearing may be removed from its operative position merely by shifting or sliding it forwards after removal of the bolts 71.

It is to be understood that the term "cooker" is used in a generic sense and is not necessarily limited to a cooker for rendering animal carcasses by sequential high pressure and high vacuum cooking operations but is also intended to include any other cooker or processing unit comprising a tank, a paddle equipped agitator shaft and power mechanism for driving the shaft. It is also to be understood that the invention is not to be restricted to the details set forth since these may be modified within the scope of the appended claims without departing from the spirit and scope of the invention.

Having thus described the invention what I claim and desire to secure by Letters Patent is:

1. In a cooker of the type that comprises a horizontally elongated tank provided with charging and discharging means therefor and having a stuffing box in the central portion of one end wall thereof, and a horizontal rotatably supported agitator shaft extending lengthwise through the central portion of the tank interior, embodying a longitudinal series of outwardly extending paddles and having one end thereof extending through, and projecting beyond, the stuffing box, the combination of a rigid mounting ring extending concentrically around, and spaced radially from, the one end of the agitator shaft, having the inner end thereof connected fixedly to said central portion of the one end wall of the tank, and provided with an opening whereby access may be had to said stuffing box, a rigid housing disposed outwards of said one end wall of the tank, supported solely by the mounting ring, and consisting of a continuous side wall, a rear wall connected to the rear end of the continuous side wall, attached directly but removably to the outer end of the mounting ring and provided with an opening in alignment with said one end of the agitator shaft, and a front wall connected to the front end of the side wall and provided with an opening in offset relation with the opening in the rear wall, and power mechanism operative to drive the agitator shaft and embodying an electric motor disposed exteriorly of, but mounted on, the side wall of the housing and arranged so that the armature shaft thereof is in parallel relation with the agitator shaft and speed reducing gearing comprising a rotatably mounted input shaft arranged in parallel relation with the agitator and armature shafts and having a portion thereof disposed within the housing and one end extending outwards through the opening in the front wall of the housing, a belt and pulley connection between armature shaft and said one end of the input shaft, a rotatably mounted output shaft arranged in parallel relation with the other shafts and having a portion thereof disposed within the housing and one end in alignment with the opening in the rear wall of the housing and connected removably to said one end of the agitator shaft, and meshing gears in the housing and between said portions of the input and output shafts.

2. In a cooker of the type that comprises a horizontally elongated tank provided with charging and discharging means therefor and having a stuffing box in the central portion of one end wall thereof, and a horizontal rotatably supported agitator shaft extending lengthwise through the central portion of the tank interior, embodying a longitudinal series of outwardly extending paddles and having one end thereof extending through, and projecting beyond, the stuffing box and provided with an annular series of longitudinally extending external splines, the combination of a rigid mounting ring extending concentrically around, and spaced radially from, the one end of the agitator shaft, having the inner end thereof connected directly and fixedly to said central portion of the one end wall of the tank, and provided with an opening whereby access may be had to said stuffing box, a rigid housing disposed outwards of said one end wall of the tank, supported solely by said mounting ring, consisting of a continuous side wall, a rear wall connected to the rear end of the continuous side wall, attached directly but removably to the outer end of the mounting ring and provided with an opening in alignment with said one end of the agitator shaft and a roller bearing around the opening, and a front wall connected to the front end of the side wall and provided with an opening in offset relation with the opening in the rear wall, and power mechanism operative to drive the agitator shaft and embodying an electric motor disposed exteriorly of, but mounted on, the side wall of the housing and arranged so that the armature shaft thereof is in parallel relation with the agitator shaft, and speed reducing gearing comprising a rotatably mounted input shaft and arranged in parallel relation with the agitator and armature shafts and having a portion thereof disposed within the housing and one end extending outwards through the opening in the front wall of the housing, a belt and pulley connection between the armature shaft of the motor and said one end of the input shaft, a rotatably mounted quill variety output shaft arranged in parallel relation with the other shafts, having a portion thereof disposed within the housing, and having one end hollow, in alignment with the opening in the rear wall of the housing, journaled in said roller bearing, and provided with an annular series of longitudinally extending internal splines in meshing and sliding relation with the external splines on said one end of the agitator shaft, and meshing gears in the housing and between said portions of the input and output shafts.

RALPH W. ILLSLEY.

References Cited in the file of this patent

UNITED STATES PATENTS

| Number | Name | Date |
|--------|------|------|
| 803,050 | Edson et al. | Oct. 31, 1905 |
| 1,630,124 | Laabs | May 24, 1927 |
| 2,108,327 | Christian | Feb. 15, 1938 |
| 2,116,166 | Christian | May 3, 1938 |
| 2,143,842 | Christian | Jan. 17, 1939 |